May 31, 1932.  J. M. DAPRON  1,860,407
SAFETY CAR EQUIPMENT
Filed June 21, 1928
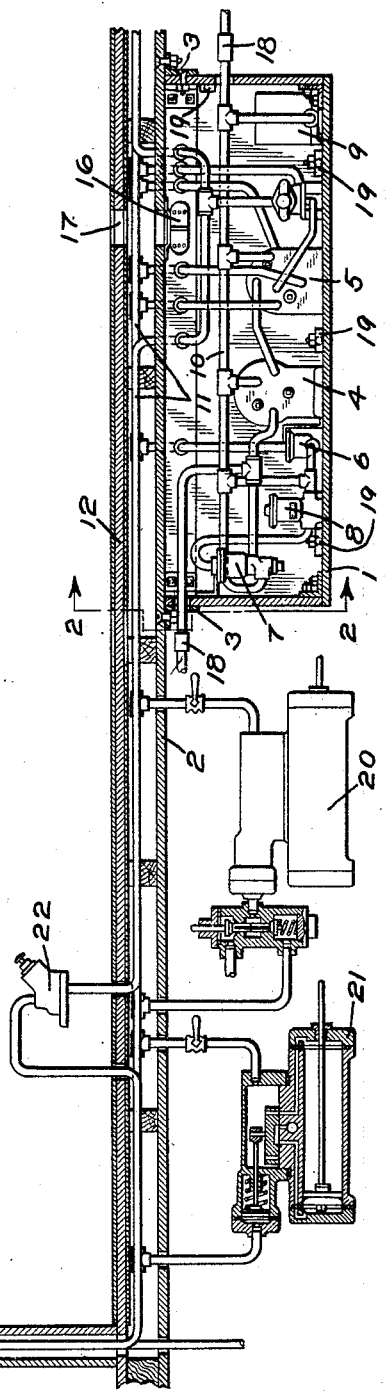
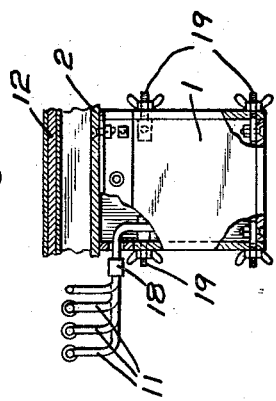
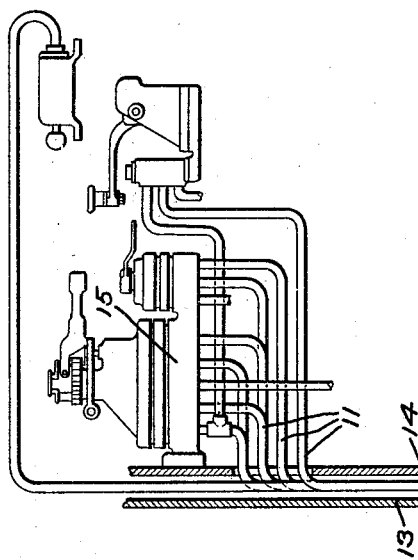
INVENTOR
JOSEPH M. DAPRON
BY Wm. N. Cady
ATTORNEY Patented May 31, 1932

1,860,407

UNITED STATES PATENT OFFICE

JOSEPH M. DAPRON, OF ST. LOUIS, MISSOURI, ASSIGNOR TO THE WESTINGHOUSE AIR BRAKE COMPANY, OF WILMERDING, PENNSYLVANIA, A CORPORATION OF PENNSYLVANIA

SAFETY CAR EQUIPMENT

Application filed June 21, 1928. Serial No. 287,096.

This invention relates to fluid pressure brake equipments, and more particularly to the installation of a safety car control equipment on a traction car.

Air brake equipments for electric traction cars have been gradually developed from a simple straight air brake with few parts to a more complicated equipment known as a safety car control equipment employing a large number of valve devices and considerable piping.

This has made it difficult for the manufacturer to find available space for the equipment on the car body.

In addition, the danger of freezing of air brake devices, as well as piping, in cold climates has made it necessary that the best possible protection be provided for these devices. As a consequence, such apparatus as triple valve devices, emergency valve devices, door and step controllers, and in fact all fluid pressure brake apparatus subject to moisture, have been installed inside the car, as well as the piping.

While this system of installing piping and valve devices inside of the car has provided the desired protection, it has tended to destroy the neat, clean appearance of the interior of the car, and has made it quite difficult for operators to keep the car floor looking neat and trim.

In some cases, cars have been equipped with the usual wood floor, covered with linoleum or rubber, and when valve devices are scattered about on the car flooring, underneath the seats, the floor covering is practically destroyed where the valve devices are located and piping must pass through.

In other cases, it has been found necessary to omit electric car heaters from underneath the seats, in order to provide space for fluid pressure valve devices. With recent types of car seats, the seat is so close to the floor, that it is practically impossible to install valve devices underneath same.

The principal object of my invention is to provide a fluid pressure brake installation in which the above difficulties are overcome.

For this purpose, valve devices are grouped together in a box installed underneath the car, and copper tubing is employed instead of the usual iron pipe. In addition, a car heater is installed in the box, which serves to prevent the apparatus in the box from freezing while also assisting in heating the car.

In the accompanying drawings, Fig. 1 is a sectional view of a portion of a car, showing my improved installation of equipment, and Fig. 2 a section on the line 2—2 of Fig. 1.

As shown in the drawings, a box 1 is secured to the under side of the car framing 2 and may be secured thereto by single brackets 3.

Within the box 1 are installed various valve units, as may be desired, such, for example, as a brake controlling valve device 4, an emergency valve device 5, a main reservoir cut-off valve device 6, a door controlling relay valve device 7, a magnet valve device 8, and an electric pump governor 9.

A pipe 10, connected to the usual main reservoir (not shown), extends into the box 1 and is connected, as required, to the various valve devices within the box. The necessary controlling pipes, designated generally by the reference numeral 11, pass through openings in the lower portion of the car framing and extend underneath the car flooring 12 to the end of the car or to both ends of the car, in the case of a double end control car.

Copper piping is employed and thus permits ready bending of the pipe, where necessary, so that the number of pipe fittings required is reduced. Copper tubing can be readily bent to fit into and around what were previously considered most difficult places for the installation of iron pipe.

The pipes 11 are bent at the end of the car and rise from the flooring in a space between the sash 13 and the dash lining 14, the pipes being again bent and extending through an opening in the dash lining to the usual brake valve device 15.

An exit door engine 20 and an entrance door engine 21 may be installed underneath the car body and a foot valve device 22 may be arranged above the car floor 12.

The copper tubing is, of course, free from scale, rust and foreign matter which is customary with iron pipe. Pipe and fitting leakage, owing to the minimum number of fillings employed, is naturally reduced. Copper tubing and brass fittings will unquestionably last the life of a car body. The valve devices installed in the box 1 being shielded from the accumulation of foreign matter, periods of inspection and lubrication may be extended.

With the group system of installation of fluid pressure devices, freezing may be prevented by installing in the box, a car seat heater 16. A register opening 17 is provided through the car flooring 12, directly above the heater, so that heat from the heater will pass into the car and the temperature of the group of devices within the box, will be maintained substantially the same as that within the car and if there is any difference, the temperature of the group will be higher.

All pipes leaving the box 1 are provided with union fittings, indicated generally by the reference numeral 18, said fittings being located outside of the box, so that if it is desired to inspect or make repairs, or test the valve devices, the union fittings may be readily disconnected and the box removed by removing the nuts of the bolts which secure the brackets 3 to the car framing.

The removed box may be replaced by another box containing a duplicate group of equipment, so that maintenance of the equipment will not cause any appreciable delay in the use of the car in service.

On the other hand, the sides of the box are removable, being held in place by thumb screws 19, so that when desired, ready access to the valve devices can be had, without removing the box from the car.

While one illustrative embodiment of the invention has been described in detail, it is not my intention to limit its scope to that embodiment or otherwise than by the terms of the appended claim.

Having now described my invention, what I claim as new and desire to secure by Letters Patent, is:—

The combination with a car body, of a box secured underneath the car body, a group of fluid pressure valve devices installed in said box, and means installed in said box for heating the interior of the box, the heat from said means being adapted to pass to the interior of the car through an opening in the car body.

In testimony whereof I have hereunto set my hand, this 18th day of June, 1928.

JOSEPH M. DAPRON.